US 010015181 B2

(12) United States Patent
Horesh et al.

(10) Patent No.: US 10,015,181 B2
(45) Date of Patent: Jul. 3, 2018

(54) USING NATURAL LANGUAGE PROCESSING FOR DETECTION OF INTENDED OR UNEXPECTED APPLICATION BEHAVIOR

(71) Applicant: International Business Machines Corporation, Armonk, NY (US)

(72) Inventors: Lior Horesh, North Salem, NY (US); Raya Horesh, North Salem, NY (US); Marco Pistoia, Amawalk, NY (US); Omer Tripp, Bronx, NY (US)

(73) Assignee: International Business Machines Corporation, Armonk, NY (US)

( * ) Notice: Subject to any disclaimer, the term of this patent is extended or adjusted under 35 U.S.C. 154(b) by 223 days.

(21) Appl. No.: 15/159,526

(22) Filed: May 19, 2016

(65) Prior Publication Data
US 2017/0339175 A1 Nov. 23, 2017

(51) Int. Cl.
G06F 17/27 (2006.01)
H04L 29/06 (2006.01)
G06F 3/0484 (2013.01)

(52) U.S. Cl.
CPC ...... *H04L 63/1425* (2013.01); *G06F 3/04842* (2013.01); *G06F 3/04847* (2013.01); *G06F 17/2785* (2013.01); *H04L 63/1416* (2013.01)

(58) Field of Classification Search
CPC .... G06F 17/20; G06F 17/227; G06F 17/2785; G06F 17/279; G06F 3/0484; G06F 3/04842; G06F 3/04847
See application file for complete search history.

(56) References Cited

U.S. PATENT DOCUMENTS

| | | | |
|---|---|---|---|
| 9,418,059 B1 * | 8/2016 | Singliar | G06F 17/30684 |
| 9,471,283 B2 * | 10/2016 | Esfahany | G06F 8/30 |
| 9,843,596 B1 * | 12/2017 | Averbuch | H04L 63/1416 |
| 2012/0066378 A1 * | 3/2012 | Lui | G06F 11/3612 709/224 |
| 2012/0284791 A1 * | 11/2012 | Miller | G06F 21/554 726/22 |
| 2013/0097706 A1 * | 4/2013 | Titonis | G06F 21/56 726/24 |
| 2014/0380282 A1 * | 12/2014 | Ravindranath Sivalingam | G06F 11/3476 717/128 |
| 2015/0113651 A1 * | 4/2015 | Kim | H04L 51/32 726/24 |
| 2015/0213358 A1 * | 7/2015 | Shelton | H04L 41/0604 706/47 |

(Continued)

OTHER PUBLICATIONS

Chandola, V.; Banerjee, A.; Kumar, V., "Anomaly detection: A survey", ACM Computing Surveys 41 (3): 1.doi:10.1145/1541880. 1541882, Jul. 2009, pp. 15:1-15:58.

(Continued)

Primary Examiner — Khang Do
(74) Attorney, Agent, or Firm — Scully, Scott, Murphy & Presser, P.C.; Daniel P. Morris, Esq.

(57) ABSTRACT

Detection of unintended application behaviors, where natural language processing (NLP) techniques are used to analyze the application, and specifically its graphical user interface (GUI), and construct an acceptable (or expected) list per-context actions. Actions executed by the application in a given context that do not fall within the list are flagged as unexpected (or anomalous).

14 Claims, 2 Drawing Sheets

(56) References Cited

U.S. PATENT DOCUMENTS

2018/0027006 A1* 1/2018 Zimmermann ..... H04L 63/1425

OTHER PUBLICATIONS

Hodge, V. J.; Austin, J., "A Survey of Outlier Detection Methodologies", Artificial Intelligence Review 22 (2): 85.doi:10.1007/s10462-004-4304-y, 2004, pp. 85-126.

Dokas, Paul; Ertoz, Levent; Kumar, Vipin; Lazarevic, Aleksandar; Srivastava, Jaideep; Tan, Pang-Ning, "Data mining for network intrusion detection", Proceedings NSF Workshop on Next Generation Data Mining, 2002, pp. 21-30.

Wang, Ke, "Anomalous Payload-Based Network Intrusion Detection", Recent Advances in Intrusion Detection, Springer Berlin. doi:10.1007/978-3-540-30143-1_11, 2004, pp. 203-222.

Perdisci, Roberto; Davide Ariu; Prahlad Fogla; Giorgio Giacinto; Wenke Lee, "McPAD : A Multiple Classifier System for Accurate Payload-based Anomaly Detection", Computer Networks, Special Issue on Traffic Classification and Its Applications to Modern Networks 5 (6), Nov. 18, 2008, pp. 1-38.

* cited by examiner

100

Instrument application A, such that (1) UI transitions are recorded (including changing the selection of the enabled UI widget), and (2) security-critical operations are monitored (e.g., sending text messages or HTTP messages, creating files, reading sensitive identifiers, etc.).
102

↓

As UI transitions occur, and are captured by the instrumentation, utilize either OCR (optical character recognition) or code analysis to obtain the text associated with the enabled UI widget(s).
104

↓

Form a sequence of NPL textual content out of the user's interactions with the application. Interleaved into this sequence are security-relevant operations that occur in between UI transitions.
106

↓

As a security-critical operation is about to execute, analyze some, or all, of the suffix leading to the operation to determine whether the operation is expected to occur at this point in execution based on NLP acceptable list textual content, and specifically its GUI, and in particular natural language understanding.
108

↓

Based on identification of the intended semantic, the system qualifies whether the application's interaction is consistent with expected behavior, or otherwise, raise a warning flag.
110

FIG. 1

USING NATURAL LANGUAGE PROCESSING FOR DETECTION OF INTENDED OR UNEXPECTED APPLICATION BEHAVIOR

BACKGROUND

Aspects of the present invention generally relate to a method and computer program product for the detection of unintended computer application behaviors, whereby natural language processing (NLP) techniques are used to analyze the application (app), and specifically its graphical user interface (GUI), and construct an acceptable (or expected) list per-context actions. Actions executed by the app in a given context that do not fall within the list are flagged as unexpected (or anomalous).

SUMMARY

Aspects of the invention are method and computer program product for detecting unintended behaviors in a computer application where natural language processing (NLP) techniques are used to analyze the application, and specifically its GUI, and construct an acceptable (or expected) list per-context actions.

An exemplary method for using natural language processing (NLP) for detecting unintended computer application behavior to construct a statistical model to determine for an application, given the application's GUI and unlabeled text, whether the application is exhibiting unintended or abnormal behavior comprises: instrumenting the application such that UI transitions are recorded as an acceptable list per-context action and security-critical operations are monitored for training the system; capturing from the instrumentation as UI transitions occur for obtaining text associated with an enabled UI widget; forming a sequence of NLP textural content from interactions with the application and interleaving into the sequence security-relevant operations that occur between UI transitions; analyzing the suffix leading to the operation as a security-critical operation is about to execute to determine whether the operation is expected to occur at this point in the execution based upon NLP acceptable list and its GUI, and qualifying whether the application interaction is consistent with expected behavior based on identification of an intended semantic from the acceptable list per-context actions, and if not, raise a warning flag.

An exemplary non-transitory computer readable medium having computer readable program for using natural language processing (NLP) for detecting unintended computer application behavior to construct a statistical model to determine for an application, given the application's GUI and unlabeled text, whether the application is exhibiting unintended or abnormal behavior comprises: instrumenting the application such that UI transitions are recorded as an acceptable list per-context action and security-critical operations are monitored for training the system; capturing from the instrumentation as UI transitions occur for obtaining text associated with an enabled UI widget; forming a sequence of NLP textural content from interactions with the application and interleaving into the sequence security-relevant operations that occur between UI transitions; analyzing the suffix leading to the operation as a security-critical operation is about to execute to determine whether the operation is expected to occur at this point in the execution based upon NLP acceptable list and its GUI, and qualifying whether the application interaction is consistent with expected behavior based on identification of an intended semantic from the acceptable list per-context actions, and if not, raise a warning flag.

The objects, features, and advantage of the present disclosure will become more clearly apparent when the following description is taken in conjunction with the accompanying drawings.

BRIEF DESCRIPTION OF THE DRAWINGS

FIG. 1 is a flow chart of an aspect of the invention.

DETAILED DESCRIPTION OF PREFERRED EMBODIMENTS

Figure 2:
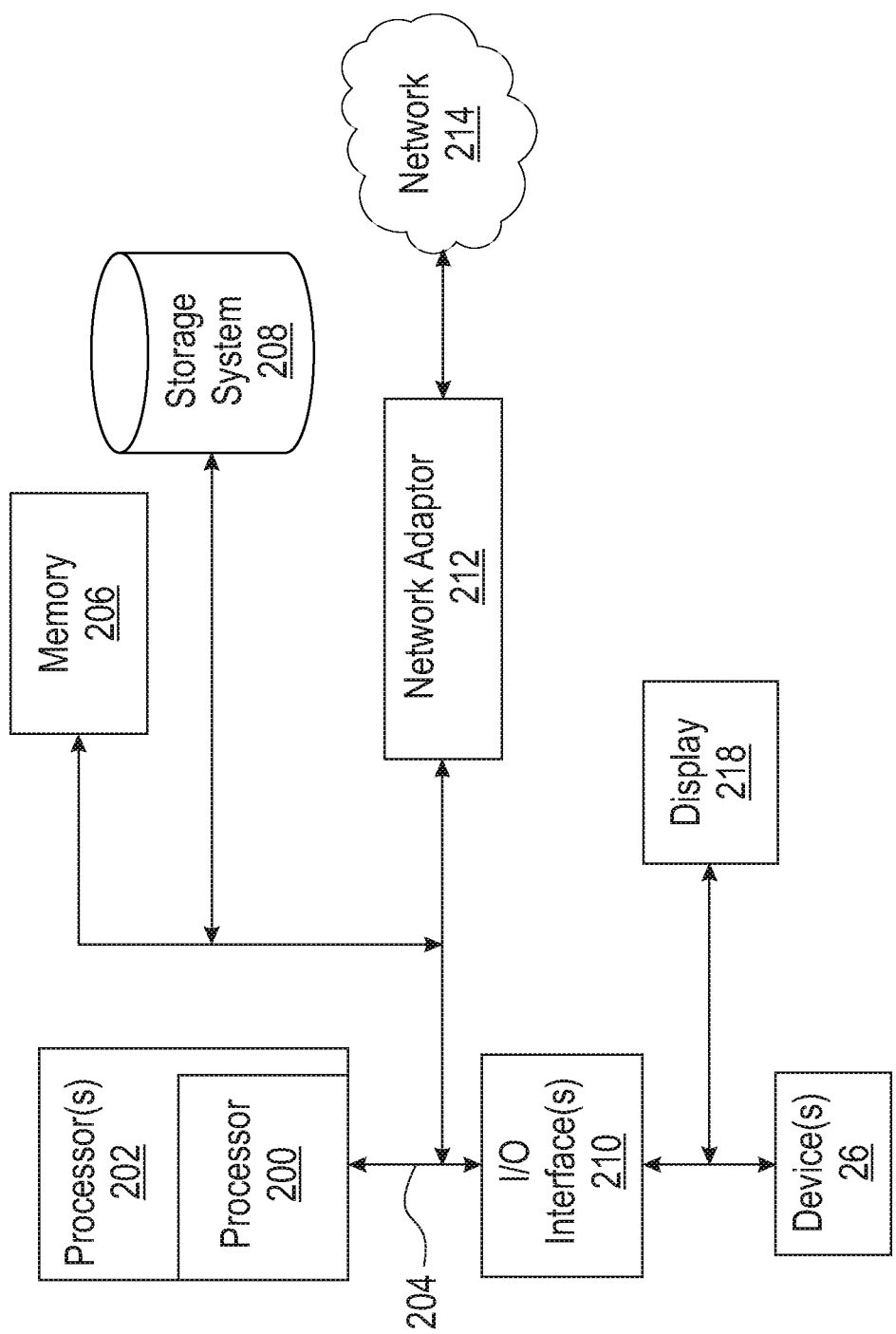
FIG. 2 is a schematic block diagram of a computer system for practicing various embodiments of the invention.

Abnormal mobile application behavior can result in inappropriate utilization of mobile resources—for example abnormal battery usage, unexpected talk and data usage, etc—that can compromise user privacy and/or lead to excess charges. Therefore, detection of malware, resource consumption abnormalities and other factors that contribute to exceptional behavior of the mobile application is a focus for many mobile security researchers.

Abnormal behavior is regarded as any behavior that deviates from what is considered normal or expected. The term "anomaly detection" generally means finding behavioral patterns that are not expected, such as data exchange, application crashes, personal information leakage, mobile function abuse, obtaining root privilege, and the like.

While basing anomaly detection on statistical analysis and understanding of common behaviors is effective, there are several limitations to this approach. First, there is the need to analyze offline a large set of executions. Second, this setting mandates the identification of useful features, or behaviors, with respect to which anomaly detection is performed. Third, as statistical analysis is agnostic to natural language meaning or context, its detection capabilities are limited to superficial-level "black-box" outlier and feature detection. Finally, if the training executions are heterogeneous, then the resulting model enables great freedom for malicious applications to apply undesired actions while still falling within what is considered the normal behavior range.

Aspects of the invention include a method for detection of unintended application behaviors, whereby natural language processing (NLP) techniques and in particular statistical NLP, which relies on stochastic, probabilistic or statistical methods to perform automatic summarization of a chunk of text or perform discourse analysis; or machine-learning-based NLP, which reduces the input data to a feature-vector representation to achieve these same goals, are used to analyze the application, and specifically its GUI, and construct an acceptable (or expected) list of expected operations per-context actions. The system is trained using a known properly functioning application for monitoring operation of the application to construct the list of expected operations. Actions executed by the application in a given context that do not fall within the list are flagged as unexpected (or anomalous). A warning flag is an indication that there is an anomaly encountered while performing the application and may be a dialog box visible to a user enabling the user to respond the unexpected application behavior. The method applies both online, as a means to enforce security/privacy considerations in real time, or offline, as a tool to test applications for security/privacy threats Aspects of the invention are described in the following example. A mobile application that features location-aware services, enabling the user to search for certain attractions (or places of interest) in a given area, is sending a text message to a premium phone number whenever the search button is hit. Communication with the user, as reflected in user interface (UI) labels as well as messages displayed by the application, does not suggest that this would happen, and so the user will likely face unexpected charges. This is an anomalous pattern of behavior, as (well-behaved) applications that perform actions such as sending text messages normally secure user awareness before doing so. A warning will be issued to advise the user of an unexpected application behavior and potential malware or anomalous operation.

In the following example, using NLP, we construct a statistical model to determine for an application A—given A's GUI and unlabeled text—whether A is exhibiting unintended, or abnormal, behavior. Steps comprising an aspect of the method are described below. Referring to FIG. 1, there is shown a flow chart 100 of an aspect of the invention.

Steps: Given application A as input, an exemplary method comprises the following steps:

(step 102) Instrument A and monitoring behavior of the application, such that (1) UI transitions are recorded (including changing the selection of the enabled UI widget), and (2) security-critical operations are monitored (e.g., sending text messages or HTTP messages, creating files, reading sensitive identifiers, etc). Instrumenting application A may be performed (assuming A is written in Java) by static/runtime bytecode editing (using e.g. java assist or ASM).

(step 104) As UI transitions occur, and are captured by the instrumentation, utilize either OCR (i.e.: optical character recognition) or code analysis to obtain the text shown to the user associated with the enabled UI widget(s).

(step 106) Form a sequence of textual content out of the user's interactions with the application. Interleaved into this sequence are security-relevant operations that occur in between UI transitions.

(step 108) As a security-critical operation is about to execute, analyze some, or all, of the suffix leading to the operation to determine whether the operation is expected to occur at this point in execution based upon NLP acceptable list, and specifically its GUI, and in particular natural language understanding.

(step 110) Based on identification of the intended semantic, what one would expect for operations is a properly functioning application, the system qualifies whether the application's interaction is consistent with expected behavior, or otherwise, raise a warning flag.

The following is an example where the method can be applied to detect intended or unexpected application behavior.

EXAMPLE

Consider a scenario where a user logs into a travel reservation application, then inputs a location (e.g., "New York") and performs a search for available hotels at that location. The sequence of textual content would roughly be:

[ "Username" ] =>
[ "Password" ] =>
[ "Login" ] => // HTTP request //
[ "Find hotels..." ] =>
[ "New York" ] =>
[ "Search" ] => // HTTP request //
[ "Grand Astoria ... " ]

As such, we would expect the specified identifiers to be released, but not other identifiers, and similarly, we would expect the URL to point to a travel/hotel reservation website. Further, as the query involves finding a hotel, we would expect the information to be released via an HTTP request rather than, for example, an SMS message.

If other than these events are detected, then a flag is raised indicating a potential malware or anomalous event is occurring with the application.

The described method steps can be applied online, as a means to enforce security/privacy considerations in real time, or offline, as a tool to test applications for security/privacy threats.

FIG. 2 illustrates a schematic diagram of an example computer or processing system that may implement detection of unintended application behaviors, whereby natural language processing techniques are used to analyze the application, and specifically its GUI, and construct an acceptable (or expected) list per-context actions in one exemplary embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 2 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 202, a system memory 206, and a bus 204 that couples various system components including system memory 206 to processor 202. The processor 202 may include a module 200 that performs the methods described herein. The module 200 may be programmed into the integrated circuits of the processor 202, or loaded from memory 206, storage device 208, or network 214 or combinations thereof.

Bus 204 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 206 can include computer system readable media in the form of volatile memory, such as random access memory (RAM) and/or cache memory or others. Computer system may further include other removable/non-removable, volatile/non-volatile computer system storage media. By way of example only, storage system 208 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 204 by one or more data media interfaces.

Computer system may also communicate with one or more external devices 216 such as a keyboard, a pointing device, a display 218, etc.; one or more devices that enable a user to interact with computer system; and/or any devices (e.g., network card, modem, etc.) that enable computer system to communicate with one or more other computing devices. Such communication can occur via Input/Output (I/O) interfaces 210.

Still yet, computer system can communicate with one or more networks 214 such as a local area network (LAN), a general wide area network (WAN), and/or a public network (e.g., the Internet) via network adapter 212. As depicted, network adapter 212 communicates with the other components of computer system via bus 204. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

Embodiments of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of using natural language processing (NLP) for detecting unintended computer application behavior to construct a statistical model to determine for an application, given the application's graphical user interface (GUI) and unlabeled text, whether the application is exhibiting unintended or abnormal behavior comprising steps of:

instrumenting the application such that user interface UI transitions are recorded as an acceptable list per-context action and security-critical operations are monitored for training the system;

capturing from the instrumentation as UI transitions occur for obtaining text associated with an enabled UI widget;

forming a sequence of NLP textural content from interactions with the application and interleaving into the sequence security-relevant operations that occur between UI transitions;

analyzing the suffix leading to the operation as a security-critical operation is about to execute to determine whether the operation is expected to occur at this point in the execution based upon the acceptable list per-context actions and its GUI, and qualifying whether the application interaction is consistent with expected behavior based on identification of an intended semantic from the acceptable list per-context actions, and if not, raise a warning flag.

2. The method of claim 1, wherein the recorded transitions include changing the selection of the enabled UI widget and the monitored security-critical operation include sending text messages or HTTP messages, creating files, or reading sensitive identifiers.

3. The method of claim 1, wherein the steps are applied online.

4. The method of claim 1, wherein the steps are applied offline.

5. The method of claim 1 wherein the capturing comprises OCR (optical character recognition) or code analysis to obtain the text.

6. The method of claim 1, wherein the analyzing based on NLP is specifically based on the GUI.

7. The method of claim 1, wherein the application is performed on a mobile device.

8. A non-transitory computer readable medium having computer readable program for using natural language processing (NLP) for detecting unintended computer application behavior to construct a statistical model to determine for an application, given the application's graphical user interface (GUI) and unlabeled text, whether the application is exhibiting unintended or abnormal behavior, program comprising:

instrumenting the application such that user interface (UI) transitions are recorded as an acceptable list per-context action and security-critical operations are monitored for training the system;

capturing from the instrumentation as UI transitions occur for obtaining text associated with an enabled UI widget;

forming a sequence of NLP textural content from interactions with the application and interleaving into the sequence security-relevant operations that occur between UI transitions;

analyzing the suffix leading to the operation as a security-critical operation is about to execute to determine whether the operation is expected to occur at this point in the execution based upon the acceptable list per-context actions and its GUI, and qualifying whether the application interaction is consistent with expected behavior based on identification of an intended semantic from the acceptable list per-context actions, and if not, raise a warning flag.

9. The non-transitory computer readable medium of claim 8, wherein the recorded transitions include changing the selection of the enabled UI widget and the monitored security-critical operation include sending text messages or HTTP messages, creating files, or reading sensitive identifiers.

10. The non-transitory computer readable medium of claim 8, wherein the steps are applied online.

11. The non-transitory computer readable medium of claim 8, wherein the steps are applied offline.

12. The non-transitory computer readable medium of claim 8, wherein the capturing comprises OCR (optical character recognition) or code analysis to obtain the text.

13. The non-transitory computer readable medium of claim 8, wherein the analyzing based on NLP is specifically based on the GUI.

14. The non-transitory computer readable medium of claim 8, wherein the application is performed on a mobile device.

* * * * *